United States Patent
Mokveld

[11] 3,993,093
[45] Nov. 23, 1976

[54] NON-RETURN VALVE

[75] Inventor: Nicolaas Jacobus Mokveld, Reeuwijk, Netherlands

[73] Assignee: Machinefabriek Mokfeld B.V., Gouda, Netherlands

[22] Filed: May 30, 1975

[21] Appl. No.: 582,201

[30] Foreign Application Priority Data
June 12, 1974 Germany............................ 2428519

[52] U.S. Cl............................... 137/484.6; 137/536; 137/220
[51] Int. Cl.².................... G05D 16/10; F16K 21/00
[58] Field of Search................ 137/484.6, 82, 116.5, 137/484.8, 484.2, 484.4, 220

[56] References Cited
UNITED STATES PATENTS

| | | | |
|---|---|---|---|
| 1,802,720 | 4/1931 | Junkers............................... | 137/536 |
| 3,134,394 | 5/1964 | Ohta............................ | 137/484.2 X |
| 3,545,483 | 12/1970 | Valdenazzi...................... | 137/495 X |
| 3,630,228 | 12/1971 | Turner.......................... | 137/484.2 X |

Primary Examiner—Martin P. Schwadron
Assistant Examiner—Robert J. Miller
Attorney, Agent, or Firm—Arthur B. Colvin

[57] ABSTRACT

This invention relates to a non-return valve or check valve in the form of a piston-type slide-valve comprising a substantially rotationally-symmetrical outer housing and a likewise substantially rotationally-symmetrical inner housing which is arranged centrally therein and which is of streamline configuration, a free annular space serving as a flow passage between the outer and the inner housings which annular space is subdivided by connecting webs and can be shut off by a piston which can be extended coaxially from the inner housing, under spring pressure, against the direction of flow of a flow medium.

2 Claims, 1 Drawing Figure

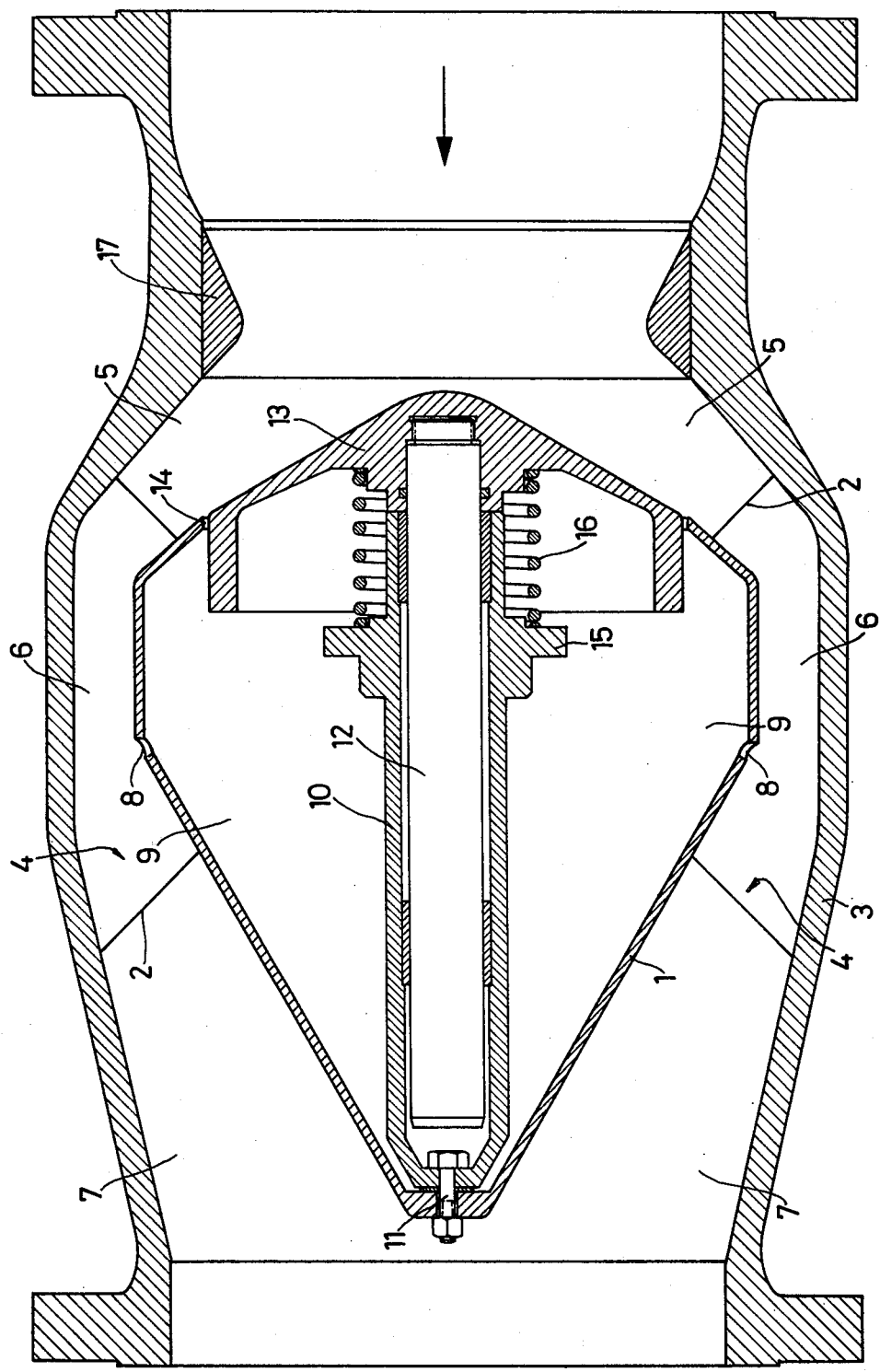

NON-RETURN VALVE

In a known piston-type slide-valve of this type, the piston is actuated with the aid of a bellows made from elastic material. The bellows is closed all-round and is disposed with its upper surface against the inside of the inner housing, which is hollow, and against the piston, the side remote from the piston being secured. The closing of the piston is effected by pressure medium admitted into the bellows from the outside. In order, in so doing, to prevent a counter-pressure from building up behind the piston around the outside of the bellows, the wall of the inner housing has one or more openings.

A valve of the described type can, in principle, also be used as a non-return or check valve if the action of the bellows is dispensed with. Upon reduction of the amount of the medium flowing through or upon reversal of the direction of flow, the piston closes onto its seat under the action of the spring pressure.

It is a known phenomenon in the case of non-return or check valves that a narrowly opened flow opening, providing only a small amount of through-flowing medium, can result in a disturbing fluttering movement of the piston.

The invention has as its object to provide a non-return or check valve of the type described in which no oscillating or fluttering movement of the piston will occur.

Making a start from the non-return or check valve referred to at the introduction to this specification, this problem is solved, in accordance with the invention, in that, by reason of the shape of the flow passage, the speed of the flow medium is first of all accelerated and then decelerated, and in that the inner housing has one or more apertures in the region of the minimum velocity of flow.

In a development of the invention, the apertures are arranged in ejector-like manner relative to the flow passage, and the flow passage terminates in the form of a diffuser.

Because of the design in accordance with the invention, the flow medium is subjected to a reduction in pressure in the closed inner part of the inner housing as compared with the pressure of the flow medium in front of and subsequent to the inner housing. This reduction in pressure, or underpressure, acts on the inner side of the piston against the spring pressure. Therefore a comparatively strong spring can be used. If the amount of medium flowing through is reduced, the pressure in the inner housing becomes less and therefore also reduces its effect on the piston and the counter-pressure of the spring, with the result that the spring forces the piston, with some force, against its seat in the outer housing. In this way the development of oscillating movements of the piston is completely obviated. The openings between the ejector and the inner housing bring about an additional damping, so that thereby undesired oscillations are also additionally avoided.

The non-return valve or check valve in accordance with the invention can be used for gaseous and liquid media. The rates of flow are not in themselves limited; however, the shape of the flow channel as an ejector must be adapted to the physical magnitudes of the respective medium.

One exemplified embodiment of the non-return valve or check valve in accordance with the invention is illustrated in the accompanying drawing in which the single FIGURE is a sectional elevation showing the valve somewhat diagrammatically in its open condition.

The illustrated valve comprises a more or less stream-line-shaped inner housing 1 which is substantially rotationally-symmetrical in configuration and is located by ribs or webs 2 centrally within an outer housing 3 of the valve which is a non-return or check valve. Between the inner housing 1 and the outer housing 3 is an annular flow passage 4 which is designed in such a way that in section 5 thereof the velocity of a medium flowing in the direction of the arrow is caused to increase, the velocity in section 6 remains almost constant, and the pressure and velocity in section 7, which is designed as closely as possible to resemble a diffuser, decreases. Openings or apertures 8 connect the section 6 to the interior 9 of the inner housing 1.

In the inner housing 1 there is a bushing 10 which may be coated, for example, with Teflon and fastened by a screw 11 to the inner housing 1. Seated displaceably in this bushing 10 is a spindle 12 the free end of which is connected securely to a piston 13 which is adapted in diameter to an opening 14 in the inner housing 1. In this connection, special sealing between the piston 13 and the inner housing 1 is not necessary. Abutting against a fixed or stationary collar 15 on the bushing 10 is a helical spring 16 which fits around the bushing 10 and which presses by its other end against the piston 13 to load the latter towards its position corresponding to the closed condition of the valve.

In the illustrated open condition of the valve, the helical spring 16 is under considerable stress which is maintained by a reduction in pressure or underpressure in the inner housing 1, said underpressure being induced therein by flow medium, flowing through the annular flow passage 4, causing entrainment of medium from within the housing 1 through the openings 8 by ejector effect.

In the closed position of the valve, the piston 13 is pressed against a seat 17 which is located in the outer housing 3 in any suitable manner. By appropriate positioning and design of the seat 17, having regard to the physical properties and velocity of the medium that is to be handled by the valve, it is possible to ensure an appropriate ejector effect in the flow passage 4.

The openings or apertures 8 can take various shapes, thus they may be in the form of slots and/or bores distributed uniformly around the periphery of the inner housing in a common plane.

Having thus described my invention, what I claim as new and desire to secure by Letters Patent of the United States is:

1. A non-return or check valve in the form of a piston-type slide-valve comprising a substantially rotationally symmetrical outer housing, a substantially rotationally symmetrical inner housing arranged co-axially within said outer housing, said inner housing being of streamlined configuration, the outer surface of said inner housing and the inner surface of said outer housing defining therebetween an annular space serving as a flow passage, connecting webs aligned with the axis of said housings extending between said housings and maintaining the same in predetermined relative position, a valve seat in said outer housing, a piston member in said inner housing, spring means yieldingly urging said piston member toward said seat in a direction opposite the direction of flow in said passage, said valve being characterized in that the shape of said flow passage is such that the velocity of the flow medium passing therethrough is accelerated at an upstream position within said passage to define a region of high pressure and is decelerated at a downstream position within said passage to define a trailing region of lower pressure, said inner housing including through-going aperture means in registry with said region of lower pressure, said aperture means comprising the sole open passage to the interior of said inner housing, whereby the pressure within said inner housing is constantly below the pressure in said region of high pressure in the unseated position of said piston against said valve seat.

2. A valve as claimed in claim 1, characterized in that the apertures are arranged in ejector-like manner relative to the flow passage, and the flow passage terminates in the form of a diffuser.

* * * * *